Figure 1:
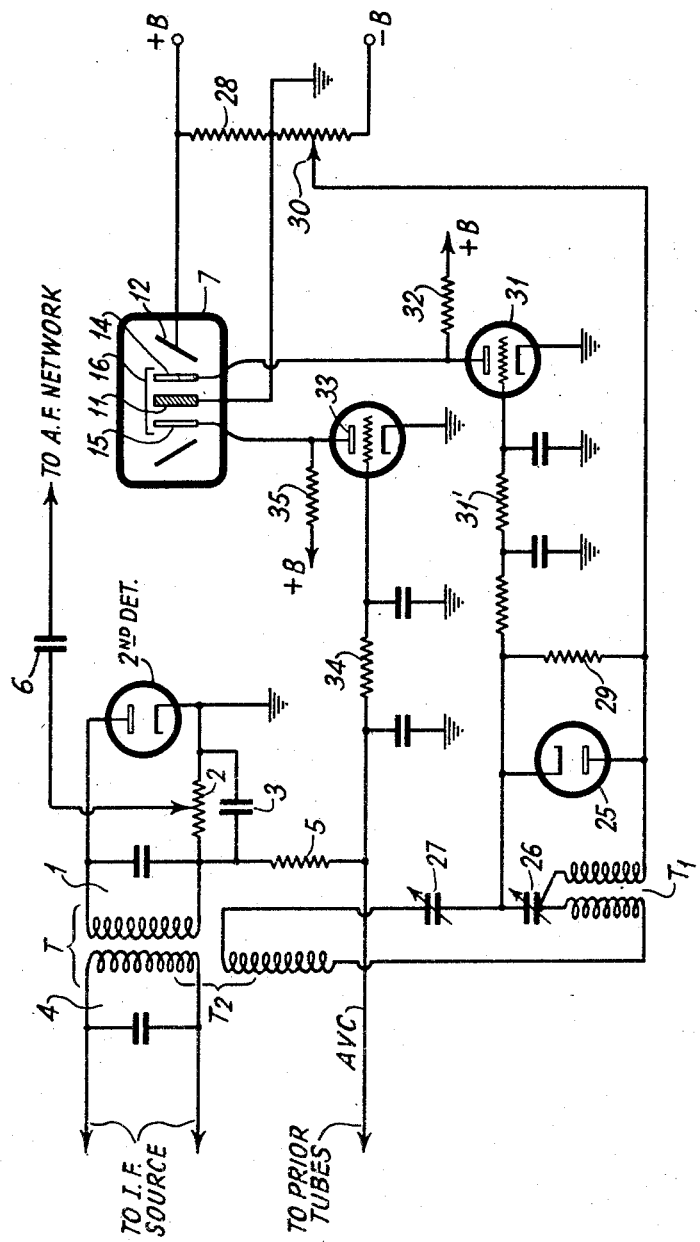

Oct. 10, 1939.  W. VAN B. ROBERTS  2,175,700
ELECTRONIC INDICATING DEVICE
Filed March 29, 1938  2 Sheets-Sheet 2

INVENTOR.
WALTER VAN B. ROBERTS
BY Charles McClair
ATTORNEY.

Patented Oct. 10, 1939

2,175,700

UNITED STATES PATENT OFFICE 2,175,700

ELECTRONIC INDICATING DEVICE

Walter van B. Roberts, Princeton, N. J., assignor to Radio Corporation of America, a corporation of Delaware Application March 29, 1938, Serial No. 198,717

3 Claims. (Cl. 250—27.5)

My invention relates to electron discharge devices, more particularly to such devices useful as visual indicators of voltage and having a fluorescent electrode which is rendered luminous and has the appearance of a pattern of light which changes in response to the change in the magnitude of the applied voltages, a device of this character being particularly suitable for indicating resonance of apparatus responsive to radio frequency currents and voltages. The present application is a continuation in part of my application, Serial No. 87,607, filed June 27, 1936 and assigned to the Radio Corporation of America.

There has been disclosed, and claimed, in United States Patent 2,051,189 of H. M. Wagner, patented August 18, 1936, an indicator tube conventionally described as the 6E5 type. Briefly such a tube comprises an envelope having within it a cathode provided with two emission sections. One of the emission sections is surrounded by amplifier electrodes comprising a grid and anode and the other is surrounded by the indicator elements. The indicator elements comprise a control electrode and a dish-shaped anode coated on its inner surface with fluorescent material. The control electrode is connected to the amplifier anode, and the amplifier section input electrode or grid is connected to a source of signal-derived direct current voltage. When maximum signal is tuned in, the luminous portion of the plate, or target, is of a maximum width. With minimum, or no, signal the electron shadow cast by the control electrode on the coated anode or target is a maximum. In a receiving system equipped with automatic volume control (A. V. C.), the grid of the indicator tube amplifier section is connected to the A. V. C. voltage source.

Experience with this type of cathode ray indicator tube, in receivers equipped with A. V. C. shows that the state of resonance of the receiver may not be truly indicated after the operator has been away from the receiver for a period of time. Since the width of the shadow cast upon the luminous screen of the indicator tube depends upon the signal strength at the receiver, a variation in signal strength may well be misinterpreted by the operator as a change in the state of tuning. For example, if the receiver is accurately tuned to resonance, and minimum shadow width is secured on the luminous screen of the indicator tube, a decrease in signal strength will cause a widening of the shadow of the indicator tube and cause the operator to believe that the set has become detuned.

Accordingly, it may be stated that it is one of the objects of my present invention to provide tuning indication means for a radio receiver equipped with A. V. C. wherein the indicator means is, in general, of the aforesaid tuning indicator tube type, but wherein the operator may at any time observe the state of tuning of the receiver and know that the indication is independent of the received signal strength.

Still another object of the invention is to provide a single indicator tube of the cathode ray type, the tube being constructed to produce a pair of shadows on a luminous screen, and wherein the width of one shadow is determined by signal strength, and the width of the other shadow is responsive solely to the resonance condition of the receiver.

A tube of this same type would be desirable as a balance indicator or as a comparison device for comparing the voltage or current conditions in two different circuits. Previous balance indicators have usually required the use of two separate motors or indicators connected in different circuits requiring duplication of instruments and circuits. In such an arrangement, due to the bulk of the measuring instruments, vision must be shifted from one indicating device to another, increasing the possibility of errors of comparison.

Hence, another object of my invention is to provide an electron discharge device of the type described which can function as a comparison device or balance indicator for indicating variations of current or voltage in two circuits to be compared, the improvement comprising independent electrode structures arranged to produce opposed shadows on the target, the difference in the shadows or the absence or presence of shadows indicating balance or unbalance of the circuits being compared.

The novel features which I believe to be characteristic of my invention are set forth with particularity in the appended claims; the invention itself, however, as to both its organization and method of operation will best be understood by reference to the following description taken in connection with the drawings in which I have indicated diagrammatically a circuit organization whereby my invention may be carried into effect.

Figure 2:
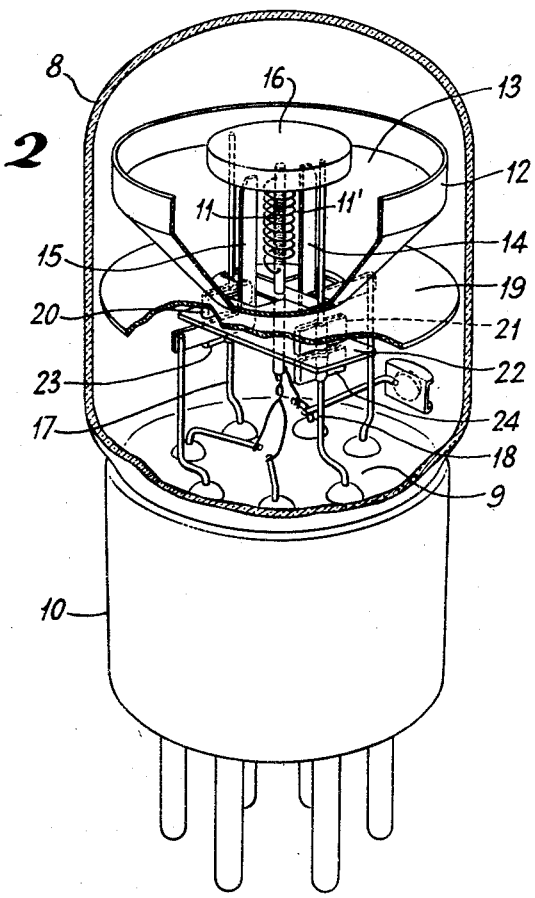
Figure 3:
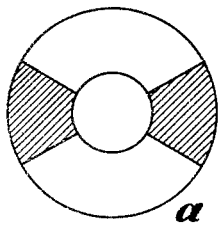
Figure 4:
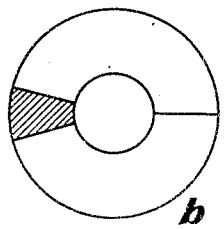
Figure 5:
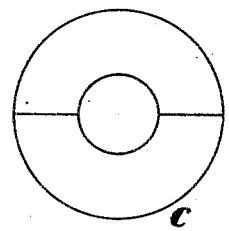

In the drawings:

Figure 1 is a circuit diagram of a portion of a receiving circuit and schematic diagram of an electron discharge device embodying the invention, Figure 2 is a perspective partly in section of an electron discharge device made in accordance with my invention, and Figures 3, 4 and 5 show the appearance of the indicator face of the target under different operating conditions.

Referring now to the accompanying drawings, in Figure 1 there is shown schematically that portion of a superheterodyne receiving system which embodies my invention. The second detector of the receiving system is shown as a diode, and its anode is connected to its grounded cathode through the I. F. input circuit 1 and the load resistor 2 arranged in series; the load resistor 2 being shunted by the I. F. by-pass condenser 3. The primary circuit 4 of the I. F. coupling transformer T is to be understood as being connected to the output of the first detector, or to the output circuit of the last I. F. amplifier. The circuits 4 and 1 are each tuned to the operating I. F., and those skilled in the art will understand that the usual superheterodyne receiver networks are to be employed ahead of circuit 4. Such networks comprise a signal collector which feeds a tunable radio frequency amplifier, and the latter feeds the first detector input circuit. A tunable local oscillator is also provided, and it is tunable over a frequency range which differs from the desired signal frequency range by a predetermined operating I. F. The latter may be chosen from a range of 175 k. c. to 450 k. c.

The direct current voltage developed across resistor 2 is used for A. V. C. purposes, and the A. V. C. lead is connected, through a filter resistor 5, to the anode side of load resistor 2. The A. V. C. lead may be connected to any of the preceding signal transmission tubes in any manner well known to those skilled in this art. The audio voltage developed across resistor 2 is transmitted through condenser 6 to the audio frequency network, and the latter may be terminated by any desired type of reproducer.

A cathode ray tuning indicator tube made according to my invention and shown in perspective in Figure 2 is shown schematically in the circuit at 7 in Figure 1. In general, the tube is provided with an envelope 8 in which is disposed the electrode elements and a stem 9 in the form of a flat press and a base 10.

These electrode elements include an indirectly heated cathode 11 of the equi-potential type, and the control elements 14 and 15 may be rods, or vane-shaped elements of sheet material, and placed edgewise to the cathode 11. The anode 12 surrounds, and is concentric with, the cathode 11, and is preferably shaped like a dishpan, with an inner coating 13 which becomes fluorescent under electron bombardment. The cap 16, positioned over the top end of cathode 11, further functions to confine the electrons, and prevents electrons from reaching the glass walls of the envelope over the top of anode 12. In this type of tuning indicator the electrons travel radially outward from the cathode to the fluorescent coating 13 on the anode in a wide beam. The extent of the surface of the anode reached by the electron beam is determined by the voltages on the control electrodes 14 and 15. The more positive these electrodes with respect to anode 12, the greater is the area of the anode covered by the beams and the greater will be the area of the fluorescent portions of the anode. The shadows on the target are eliminated or at a minimum width when the voltages on the control electrodes 14 and 15 are at a maximum.

The mount assembly is supported within the envelope on the two support rods 17 and 18 fused into the press of the tube. The cap 16 and the anode 12 are mounted at the upper ends of these support rods and the mica disc 19, serving also as a spacer between the envelope and the mount assembly, is positioned beneath the anode 12 and retained in place by the clips 20 and 21 secured to the supports 17 and 18 below the mica. The cathode is supported in aligned apertures in the mica 19 and the lower mica 22 retained in place on the support rods by welded clips 23 and 24. A grid 11' may surround the cathode for limiting the space current.

The constants of the circuits with which the tube is used are so chosen that with no signal impressed on the receiving circuit the shadows cast by the side rods are those shown in Figure 3, which represents the top end view of the tube 7. With the set tuned to resonance and with normal signal applied to both control rods the shadows may be eliminated and the target may take the appearance shown in 5. If for any reason the voltages impressed on the control rods vary by different amounts, the pattern on the fluorescent anode may be as indicated in Figure 4.

Two separate circuits deriving their energy from the I. F. course apply voltages to the control electrodes 14 and 15 of the indicator device. The cathode and anode of diode 25 are connected in shunt across a circuit comprising the variable tuning condenser 26 and the secondary of transformer T₁. The I. F. signal energy is impressed across the circuit 27—26—T₁ by means of a transformer T₂. The variable condenser 27 tunes the secondary of transformer T₂, the primary of T₁ and condenser 26 to resonance so as to provide a rapid voltage rise off resonance. The energizing potentials for tube 7 are derived from the voltage bleeder resistor 28, the diode anode end of resistor 29 being connected through an adjustable tap 30 to a point on resistor 28. The cathode of tube 31 is connected to ground which is more positive than tap 30, and the fluorescent screen or anode 12 of the tube 7 is connected to a still more positive potential point on the bleeder resistor. A direct current pulsating component filter network 31' may be connected between grid of tube 31 and resistor 29. Plate of tube 31 is connected through resistors 32 to the positive terminal of the voltage source and at the same point as the fluorescent anode of tube 7.

When correctly tuned signals are impressed on the circuit 26—T₁, the voltage transferred across this circuit to diode 25 will be zero, since the reactance of condenser 26 is adjusted to be equal and opposite to the mutual reactance between the windings of T₁ at the operating I. F. In this case the voltage drop across resistor 29 is practically zero, and, therefore, the grid of the amplifier section of tube 31 will be negative with respect to the cathode. The voltage drop across resistor 32 will be a certain small amount depending on the position of tap 30, with the result that the shadow on the fluorescent anode will take on a desired normal width. However, as the I. F. energy impressed on the circuit 26—T₁ departs from the resonant frequency, then voltage begins to be impressed on diode 25 with the result that the cathode side of resistor 29 becomes more positive, and the direct current voltage drop across resistor 32 increases decreasing the voltage on anode of tube 31. This results in a widening of the shadow cast by rod 14 because the anode voltage of tube 31 drops and control rod 14 connected to it becomes more negative with respect to the anode or target 12 of tube 7. If the operator leaves the receiver, and the signal amplitude should decrease due to fading, and the operator then returns to the set, he can immediately tell that the receiver is still in resonance, but that the signal strength has decreased. This follows from the fact that as long as the receiver is in resonance, the shadow cast by rod 14 will be of its normal width, and only widens out when the receiver is detuned from the desired signal.

The control electrode 15 is connected to the plate of the phase inversion tube 33, and the grid of the latter is connected through filter 34, which filters out or suppresses the direct current pulsating component developed across resistor 2, to the A. V. C. lead. The A. V. C. voltage determines the shadow cast by control rod 15. The electrode 15 casts a shadow on the luminous inner face 13 of anode 12, and this shadow becomes narrower as the received signal strength increases. This is due to the increased negative voltage on the grid of tube 31 and the decrease in current and voltage drop in resistance 35. This causes the anode voltage of tube 33 to become more positive and also that on control electrode 15, decreasing the electron shadow. On the other hand electrode 14 produces the minimum shadow regardless of signal strength when the receiver is in tune. The potentials of the electrodes 14 and 15 determine the width of the electrical shadows.

The signal intensity at which the shadows become zero as shown in Figure 5 may be adjusted by providing resistors 32 and 35 with slidable contacts, or by varying the tap 30 in Figure 1. Considering the operation of the circuit shown in Figure 1, it has already been pointed out that there will be practically no shadows when the receiver is exactly in tune to the desired signal. The shadows may, however, be of some width, varying with fading, changing of signal strength or detuning. Such a condition is shown in Figure 4 for example. Here although the set is still tuned to resonance as indicated by the absence of a shadow in the right hand side of Figure 4 some shadow less than that with no signal is shown at the left hand side of Figure 4 indicating change in signal strength.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An electron discharge device having an envelope, a cathode within said envelope for emitting electrons, a dish-shaped anode surrounding said cathode and having its interior surface coated with fluorescent material for receiving electrons from said cathode to produce a luminous pattern on said anode, and a pair of control electrodes electrically insulated from each other and disposed on opposite sides of said cathode and positioned between the cathode and the anode for determining the area of fluorescent surface of the anode reached by the electrons from said cathode.

2. An electron discharge device having an envelope, a cathode within said envelope for emitting electrons, a dish-shaped anode surrounding said cathode and having its interior surface coated with a fluorescent material for receiving electrons from said cathode to produce a pattern of light, a straight rod-like control electrode positioned between said cathode and said anode and parallel to said cathode, and a cup-shaped member positioned over the end of said cathode and cooperating with said dish-shaped anode to confine the electrons from said cathode to the interior surface of said anode, and a pair of support rods extending through said dish-shaped anode, said anode and cap being mounted at the free ends of said support rods in spaced relationship, and a pair of insulating spacing members mounted in spaced relation on said support rods beneath said dish-shaped anode, one of said insulating spacing members being in immediate contact with the bottom of said anode each of said insulating members having an aperture, said apertures being aligned and into which said cathode extends to be supported by said spacing members.

3. An electron discharge device having an envelope, a cathode within said envelope for emitting electrons, a dish-shaped anode surrounding said cathode and having its interior surface coated with a fluorescent material for receiving electrons from said cathode to produce a pattern of light, straight rod-like control electrodes positioned on opposite sides of said cathode and between said cathode and said anode and parallel to said cathode, and a cup-shaped member positioned over the end of said cathode and cooperating with said dish-shaped anode to confine the electrons from said cathode to the interior surface of said anode, and a pair of support rods extending longitudinally of said envelope and supporting the cathode and anode in spaced relationship within said envelope, the cap and anode being supported in spaced relation at the free ends of said rods, an insulating member transverse to the envelope and said electrodes and supported by said rods adjacent the bottom of said dish-shaped anode and clip members on said support rods maintaining said transverse insulating member in position and a second transverse spacing member mounted on said rods and clips on said support rods on the other side of said last spacer member from said first clips maintaining said second insulating member in position, said insulating members having aligned apertures supporting the cathode in position.

WALTER van B. ROBERTS.